(12) United States Patent
Lesseinger et al.

(10) Patent No.: US 11,982,479 B2
(45) Date of Patent: May 14, 2024

(54) DIGITAL REFRIGERATION CONTROLLER WITH INTEGRATED MODULE DRIVEN ELECTRONIC EXPANSION VALVE

(71) Applicants: Ivanir Antônio Gobbi, Canoas/RS (BR); Flávio Paulo Perguer, Poro Alegre/RS (BR)

(72) Inventors: Samuel Lesseinger, Novo Hamburgo/RS (BR); Christian Eduardo Saul, Novo Hamburgo/RS (BR); Edson Rodrigo Da Silva Paz, Canoas/RS (BR); Maicon Giesch, Cachoeirinha/RS (BR)

(*) Notice: Subject to any disclaimer, the term of this patent is extended or adjusted under 35 U.S.C. 154(b) by 0 days.

(21) Appl. No.: 18/270,272

(22) PCT Filed: Apr. 22, 2021

(86) PCT No.: PCT/BR2021/050168
§ 371 (c)(1),
(2) Date: Jun. 29, 2023

(87) PCT Pub. No.: WO2022/155715
PCT Pub. Date: Jul. 28, 2022

(65) Prior Publication Data
US 2024/0044563 A1   Feb. 8, 2024

(30) Foreign Application Priority Data

Jan. 21, 2021 (BR) .................. BR 102021001093-2

(51) Int. Cl.
*F25B 49/02* (2006.01)
*F25B 41/34* (2021.01)
(Continued)

(52) U.S. Cl.
CPC .............. *F25B 49/02* (2013.01); *F25B 41/34* (2021.01); *G05B 19/042* (2013.01); *G05B 19/048* (2013.01)

(58) Field of Classification Search
CPC ........ F25B 49/02; F25B 41/34; G05B 19/042; G05B 19/048
See application file for complete search history.

(56) References Cited

U.S. PATENT DOCUMENTS 4,152,902 A * 5/1979 Lush ....................... F04C 28/02
                                                           62/157
4,270,361 A * 6/1981 La Barge ........... G05D 23/1925
                                                           62/211

(Continued)

*Primary Examiner* — Miguel A Diaz
(74) *Attorney, Agent, or Firm* — Donald J. Ersler

(57) ABSTRACT

A digital refrigeration controller (100) with integrated module driven Step Motor Electronic Expansion Valve. The digital refrigeration controller (100) comprises a System (200) with a Processing Unit (206) for management of the digital controller (100), Unit (206) being connected to Serial Communication Interface (202), Sensor Signal Conditioning System (203), Charge Control System (204), Human-Machine Interface (205), Power Supply Detection and Selection System (207), Backup Power Supply Charging System (208), Real Time Clock (209) and Step Motor Electronic Expansion Valve Drive System (210). System (200) comprises further the following elements: Power Supply (201), a Backup Power Supply (211) and a Current Monitor (212). In case of power outage, the different elements of the system interact to keep the step motor electronic expansion valve closed without the need of external modules.

8 Claims, 4 Drawing Sheets

(51) Int. Cl.
*G05B 19/042* (2006.01)
*G05B 19/048* (2006.01)

(56) References Cited

U.S. PATENT DOCUMENTS

| | | | | |
|---|---|---|---|---|
| 5,551,248 | A | * | 9/1996 | Derosier .................. F24F 11/38 62/181 |
| 7,047,753 | B2 | * | 5/2006 | Street .................... F25B 49/022 62/126 |
| 9,238,398 | B2 | | 1/2016 | Lu et al. |
| 9,852,963 | B2 | * | 12/2017 | Shedd ....................... F28F 9/26 |
| 9,945,597 | B2 | | 4/2018 | Sandkoetter et al. |
| 10,488,083 | B2 | * | 11/2019 | Eicher ..................... F24F 13/20 |
| 2002/0020175 | A1 | * | 2/2002 | Street ................. G05D 23/1917 62/132 |
| 2018/0120795 | A1 | * | 5/2018 | Ogawa ................... F16K 31/02 |
| 2019/0017734 | A1 | * | 1/2019 | Hieble ................. G05B 19/042 |

* cited by examiner

STATE-OF-THE-ART TECHNIQUE

INVENTION

DIGITAL REFRIGERATION CONTROLLER WITH INTEGRATED MODULE DRIVEN ELECTRONIC EXPANSION VALVE

FIELD OF THE INVENTION

The present invention belongs to the field of digital electronic controllers, more specifically, to the control of digital refrigeration devices and refrigerant fluid superheat degree with Proportional-Integral-Derivative (PID) feed back.

BACKGROUND OF THE INVENTION

The refrigeration cycle comprises the steps of compression, condensation, expansion and evaporation. In the context of expansion, the present systems make use of mechanical thermostatic valves requiring frequent adjustments and which show low resolution in the refrigerant fluid superheat degree control.

Superheat degree is defined as the saturated temperature differential, converted by the fluid pressure and temperature at the suction port, traditionally at the distal end of the evaporator. Superheat should be sufficiently high for the condition of the liquid state refrigerant fluid return to the compressor not to occur, which could cause it to break. However, high superheat damages the refrigeration system energy efficiency associated with increased physical dimension of the evaporator.

In this context, a suitable superheat degree control is crucial for the high efficiency of the refrigeration cycle, improving the coefficient of performance (COP=Refrigeration power/Compression power), however mechanical thermostatic valves exhibit limited accuracy for this control.

This scenario fosters the use of electronic expansion valves that can be of the pulse or step motor type. However, it is well-known from the literature that the pulse valves control accuracy is reduced, since their cyclic opening and closing movement results in water hammers to the tubing, restricting their use to refrigeration capacities of the order of 64 kW, see <https://www.castel.it/wp-content/uploads/2018/01/Solenoid-expansion-valves pdf> and <https://www-.carel.com/documents/10191/0/%2B4000009EN/e2e45752-2e75-47d7-aed8-3a9865803c88>.

To overcome this limitation, step motor control valves are used, with superior performance in regulating the refrigerant fluid by enabling more uniform and continuous variation.

Usually, step motor electronic expansion valves require a dedicated actuator device, increasing their final implementation cost and volume, since besides the refrigeration controller a driver device should be employed.

One drawback of the step motor electronic expansion valve is that it remains open in case of power shortages during working. The current solution to overcome this issue is to make use of batteries or modules external to the actuator device to store sufficient power for the automatic closure of the valve, which implies in added implementation costs and further volume increase, besides the complexity of electrical connections and mechanical attachments.

Nowadays, a further solution also employed is to block the refrigerant fluid flow by means of a solenoid valve, in this way, in case of power outage the solenoid valve is closed and the flow is interrupted. In this solution elements are added, resulting in added implementation costs since a more complex installation and inputs acquisition is required.

Among the commercial equipment to be found in the Brazilian market are the RAC expansion valve kit, available on https://www.racbrasil.com/product-page/valvulaexpeletronica the manual being available on https://drive-.google.com/file/d/1654t09BGkdtMNZGxl1IhWy_nownPWFxr/view, besides the MPXPRO product by Carel company, available on https://www.carel.com.br/product/mpxpro the manual being available on as https://www.carel.com.br/documents/10191/0/+0300055PT/2ef2519c-4268-42b1-915a-db974c24814a?version=1.5, as well as the EKE 1A equipment by Danfoss company, available on https://store.danfoss.com/bript_BR/Refrigera % C3% A7% C3% A3o-e-Ar-Condicionado/Controles-Eletr % C3% B4nicos/Controlador-eletr % C3% B4nico-de-superaquecimento/Controlador-de-superaquecimento %2C-EKE-1A/p/080G5300, do not comply with the requirements of the product shown here since they require additional Hardware modules such as Human-Machine Interfaces or elements and extra actuator modules and energy storage.

On the "Beacon II refrigeration system", equipment by the Heatcraft Refrigeration Products, available on https://www.heatcraftrpd.com/PDF/Sales%20Brochures/SB-BEA-CONII.pdf, and related to U.S. Pat. No. 5,551,248 patent, besides the huge volume a solenoid valve is required to close the refrigeration circuit in case of power outage.

Further, as an example of a current product, developed by the Applicant, the VX950E Plus model, available on https://www.fullgauge.com.br/produto-vx-950-plus. A Human-Machine Interface separated from the controller is required, as well as the addition of an extra power storage module.

As for the Danfoss company EKE 1A product, it has only the step motor electronic expansion valves actuation function, being known in the market by the expression Driver, related to equipment that just actuate the expansion valve or control the superheat degree.

When the RAC expansion valve kit is considered, its application is limited to pulse expansion valves, also known as PWM, which restricts its use to powers up to 32 kW.

The unipolar step motor electronic expansion valves reach powers as high as 120 kW see <https://cdn.sanhuaeurope-.co.uk/new_content/static/uploads/files/products/en/ds-dpf-ts-s-en-r2007-1595836555.pdf#find-technical-info> and of the order of 2269 kW for the so-called bipolar step motor, see <https://cdn.sanhuaeurope.co.uk/new_content/static/uploads/files/products/en/ds-vpf-en-r2006-1591955358.pdf#find-technical-info> which provides wide application in industrial and commercial refrigeration. Besides, power consumption by the step motor electronic valves is lower than that of the pulse valves.

As regards patent documents related to the state-of-the-art technique for methods and apparatuses for controlling the superheat degree, the literature provides U.S. Pat. Nos. 4,067,203, 4,523,435, 4,617,804, 4,674,292, 4,787,213, however, said apparatuses are not compact, do not exhibit the features present herein and do not incorporate the same functionalities.

Further patent documents related to the matter are discussed below.

U.S. Pat. No. 5,551,248 patent teaches the integrated control of a device cooling system. The device receives data from temperature sensors, one of these sensors being designed to assess the evaporator superheat. To regulate the evaporator superheat and the discharge temperature of the compressor the control device adjusts incrementally the cooling system expansion valve position.

In U.S. Pat. No. 7,290,402 patent an expansion valve control system and the expansion valve control method are described. In one mode, the control system comprises 1) a superheat failure circuit configured to derive a superheat failure for a fluid associated with the expansion valve; and 2) a circuit for the valve position associated with the superheat failure circuit, configured to reposition the expansion valve based proportionally both on the current position of same and the superheat failure. In U.S. Pat. No. 7,290,402 patent only the electronic valve control method is implemented, the remaining working mechanisms of the refrigeration system being not considered.

In U.S. Pat. No. 7,788,937 patent in case the opening degree of an electronic expansion valve (14) is kept below a specific opening degree or if the superheat degree of a refrigerator in an evaporator (15) is kept above a certain superheat degree, the amount of circulating refrigerant is considered insufficient. In this way, the volume of air delivered by a refrigerator ventilator (22) is reduced. In U.S. Pat. No. 7,788,937 patent a control method for the electronic expansion valve (14) is implemented, together with the description of the refrigeration system topology.

U.S. Pat. No. 9,151,526 patent teaches a system for the vapor compression refrigeration cycle including a compressor and an electronic expansion valve connected between the first and second refrigerant ports of a compressor. A controller for the electronic expansion valve is configured to control the refrigerant flow by the expansion valve in response to a superheat temperature of the refrigerant. The controller is configured to execute a first control algorithm until the occurrence of a local superheat temperature maximum, then a second control algorithm is executed. In this North-American patent document a control algorithm is implemented in a driver, to control only the electronic valve superheat while the object of the invention, that is, a compact equipment, is not focused.

All of the state-of-the-art documents cited above are directed to electronic expansion valves control methods, however all of them comply with a general setup such as that of FIG. 1 attached herein and described in the present specification.

For state-of-the-art refrigeration controllers, a system for the control of refrigeration and superheat degree of the refrigerant fluid is generally arranged in individual modules, such as can be seen in FIG. 1 attached to the present specification, where the control element (302) is external, being connected by wires to actuation driver (303) of electronic expansion valve (301) which is powered by external storage (304) acting on electronic valve (301). The state-of-the-art technique as represented in FIG. 1 has external modules, requiring several additional electrical connections, which contribute to high failure potential in the setup, extra cost resulting from wires and cables, besides the over-dimensioning of electrical command boards and panels, rendering the setup complex and of difficult implementation.

Therefore, the patent documents as well as catalogs and commercially available devices, neither individually or combined envisage the inventive setup with an integrated module for the superheat control of an electronic expansion valve in a temperature controller.

SUMMARY OF THE INVENTION

The digital refrigeration controller object of the invention combines in a same compact, single-module setup, a digital refrigeration controller (100) that performs the function of temperature control with defrosting logic by scheduling and of refrigerant fluid pump down.

The digital refrigeration controller (100) comprising a system (200), is also provided with functions and control logics for the compressor, ventilator, lamp and alarms, besides the function of power saving by scheduling and Real-Time Watch (209), an actuating Step Motor Electronic Expansion Valve System (210), a System (212) for monitoring the power consumed by the electronic expansion valve (not represented), an Emergency Energy Storage System (208) (for valve closure in case of power outage), a Load Control System (204), an Emergency Power Source (211) and a Source Detection and Selection System (207).

Therefore, the digital refrigeration controller (100) comprises a Control System (200) able to integrate the cited elements in a compact system, thus altering the current functional concept to be encountered in similar systems by enabling the electrical and mechanical installation process to be simplified and lower the amount of inputs and raw-materials. The connections of the Processing Unit (206) with the other elements of System (200) make it possible the compact flow of control signals and measurement data, being relevant to the purposes of the digital refrigeration controller (100).

Besides, the inventive system is provided with a feedback system with a PID control algorithm digitally implemented by Processing Unit (206) that adjusts the step motor electronic expansion valve opening in accordance with the refrigeration process variables, such as kind of refrigerant fluid, and temperature and pressure of the system.

Thus, one objective of the invention is a compact digital refrigeration controller, the system setup being so as to integrate all of the elements designed for the superheat control of the electronic expansion valve in one single module.

A further objective is a digital refrigeration controller where the setup of the superheat control system of the electronic expansion valve not only excludes power external modules whenever it drops, but also the addition of solenoid valves, the control system being contained in one single module.

A further objective is a digital refrigeration controller where the setup of the superheat control system of the refrigerant fluid and the interaction of the respective functions enable improved control of the refrigeration process.

A further objective is a digital refrigeration controller provided with a control system able to keep the electronic expansion valve closed in case of the main power source drop without the need of power external modules.

An additional objective is the creation of a refrigerant fluid pump down function with the aid of Sensor Signal Conditioning System (203) upon the measurement of the refrigerant fluid pressure without the need of equipment external to the digital refrigeration controller.

DETAILED DESCRIPTION OF THE INVENTION

According to the invention, the expression "integrated module" or "single module" means that all of the elements which compose the control system of the present controller are contained in a single housing, in opposition to state-of-the-art controllers which employ several coupled modules by means of electrical connections and linkages, both plastic and metallic.

Still in accordance with the invention, the expression "step motor expansion electronic valve" encompasses both the unipolar and the bipolar step motor.

Still in accordance with the invention, in the present specification, claims and abstract, the expression "controller" is equivalent to the expressions "digital refrigeration controller" or "digital controller" or still, "refrigeration controller".

The invention comprises, therefore, a digital refrigeration controller where, contrary to the state-of-the-art controllers comprising several modules, the electronic expansion valve superheat control is provided by a system contained in one single module.

The invention will be described below by reference to the attached Figures.

Figure 2:
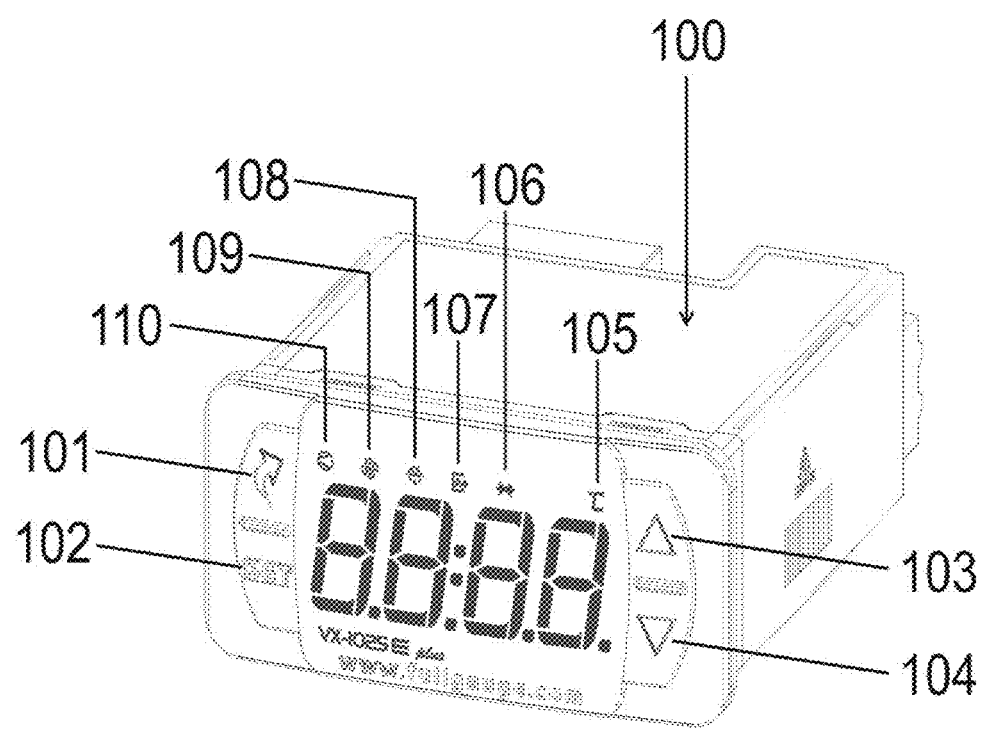
FIG. 2 is a schematic illustration of the front portion of the equipment for refrigeration control employing the inventive system.

Thus, FIG. 2 shows the front view of controller (100) with the elements of the Human-Machine Interface (205) (see FIG. 4), namely, key (101) to access the so-called facilitated menu, where a set of easy access parameters is available to the user. By pressing key (101) it is possible to navigate through the facilitated menu and by pressing key (102) it is possible to select the desired menu option, keys (103) and (104) enabling the increment and decrement of the parameter seen on the front display. LED (110) informs the status of compressor (132) output, LED (109) informs the output status of ventilator (133), LED (108) informs the defrost output (134) status, LED (107) informs the lamp (135) or auxiliary (135) output status, LED (106) informs the modulation process of the step motor electronic expansion valve and LED (105) informs the scale utilized by the controller in degrees Celsius or Fahrenheit.

Figure 3:
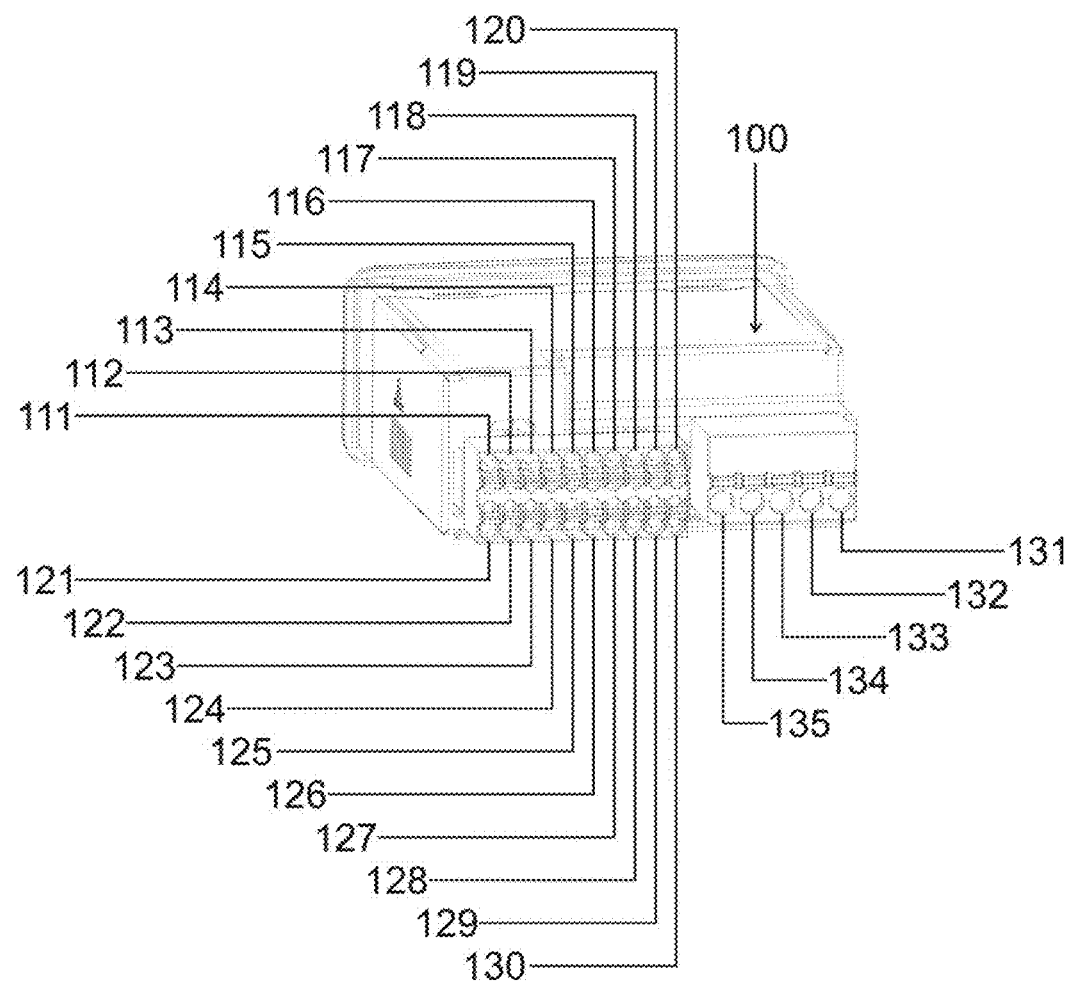
FIG. 3 is a schematic illustration of the rear portion of the equipment for refrigeration control employing the inventive system.

FIG. 3 shows the rear view of the digital refrigeration controller (100) where the connector with reference numerals from (111) to (130) is intended for connections with sensors, power source, serial communication and connection with the step motor electronic expansion valve. The connector with reference numerals from (131) to (135) is intended for power connections.

The temperature sensor for the power measured in the refrigeration process referred to as S1 is connected between (111) and (112), the sensor for the current temperature measured in the evaporator referred to as S2 is connected between (113) and (114), the sensor for current temperature measured at the compressor suction port referred to as S3 is connected between (115) and (116), and the sensor for suction pressure of the refrigerant fluid in the compressor, referred to as P1 is connected between (123) e (124). These sensors are those mentioned in the Sensor Signal Conditioning System (203) element of FIG. 4.

The power supply of the digital refrigeration controller (100) is performed between (121) and (122), between (117) and (118) a digital input is present, and between (119) and (120) there is a serial communication port.

The step motor electronic expansion valve (not represented) is connected between (126) up to (130).

Still in FIG. 3, the compressor (132) output, the ventilator (133) output, the defrost output (134) the lamp (135) or auxiliary (135) output and at (131) the common terminal can be observed.

Figure 4:
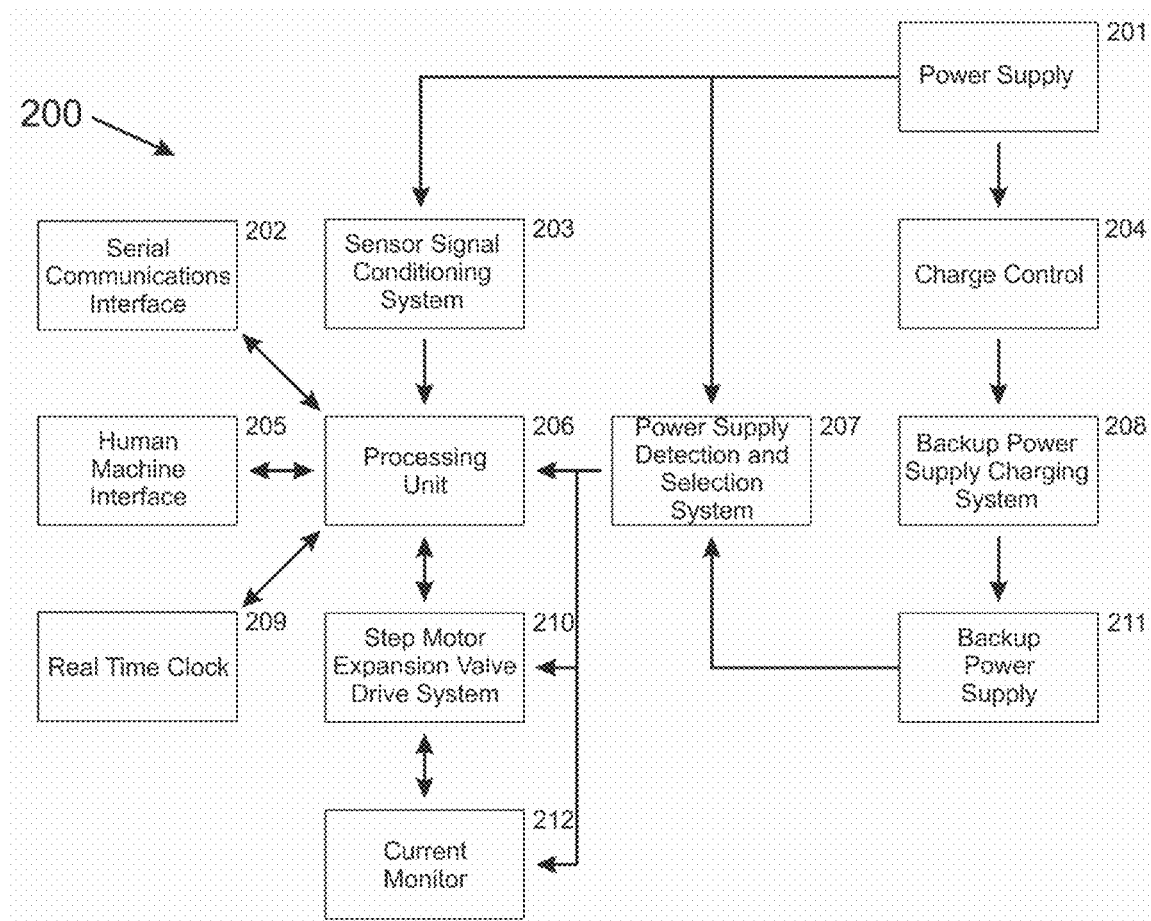
FIG. 4 is a simplified flowsheet of the compact, single-module integrated system for refrigeration control employing the inventive system.

On the other hand, FIG. 4 is a flowsheet of system (200) internal elements for the control of refrigeration and superheat degree of the refrigerant fluid and their logical and functional interactions to create the digital refrigeration controller (100).

In System (200), a Human-Machine Interface (205) is provided with access keys for navigating the controller program and increment/decrement of the parameters programmed in a non-volatile inner memory, as well as a LED display for viewing the process parameters and messages to the user. These elements have been described by reference to FIG. 2.

The elements which form System (200) of the inventive digital refrigeration controller (100) are commercially available and will be described in detail below in the present specification.

System (200) for superheat control of the digital refrigeration controller (100) refrigerant fluid comprises, in a single module, the following elements:

A Main Power Source (201) to provide suitable power levels to the internal elements of System (200), connected between (121) and (122) (see FIG. 3) with 12V voltage under direct current. A Power Source (201) useful for the purposes of the invention comprises voltage regulating semiconductor integrated circuits, providing suitable levels of electrical potential for polarization of System (200) elements.

A Serial Communication (202) Interface by serial communication standard RS485 for interfacing and remote-control operation. This kind of interface is useful for the purposes of the invention since it enables the reception of operation commands, reception of recipes and scheduling of events, reading and writing of the function parameters saved in a non-volatile electronic memory, and monitoring of the Sensor Signal Conditioning System (203) measurements.

A Sensor Signal Conditioning System (203) to condition the sensor signals into a standard compatible with the Processing Unit (206) electrical standard. A Sensor Signal Conditioning System (203) useful for the purposes of the invention comprises an arrangement of sensors and capacitors disposed as attenuation and signal filtering networks for conditioning sensor signals at power levels suitable for the Processing Unit (206) working.

A Power Control System (204) for maintaining the power level suitable to the Emergency Energy storage system (208). System (204) is useful for the purposes of the invention since it secures through the use of semiconductor transistors a minimum level of stored energy, besides protection against overloads, securing safety.

A Human-Machine (205) Interface provided with keys and a LED display. Interface (205) is useful for the purposes of the invention since it enables the user to have facilitated access to the function menu and instant visualization of the refrigeration process measurements.

A Processing Unit (206), also called onboard processing unit, which manages all the controller (100). Unit (206) is useful for the purposes of the invention since it is able to execute instructions which have been pre-programmed and stored in a non-volatile electronic memory, making it possible to develop control, supervision and data communication algorithms.

A Power Source Detection and Selection System (207) enabling the digital refrigeration controller (100) to operate even in case of power outage. A Power Source Detection and Selection System (207) useful for the purposes of the invention comprises an electronic voltage comparator to signalize the occurrence of power shortage at the Main Power Source (201) securing quick commutation towards Emergency Power Source (211).

An Emergency Power Storage System (208) able to keep sufficient energy for the closure of the electronic valve (not represented) in case of power shortage or drop. An Emergency Power Backup System (208) useful for the purposes of the invention comprises a solid-state element having electrical properties of electrostatic energy storage.

A Real Time Clock (209) able to synchronize the digital refrigeration controller (100). A Real Time Clock (209) useful for the purposes of the invention comprises a specific integrated circuit having data interface with Processing Unit (206) thus enabling the creation of defrosting events scheduling and entry in economy mode.

A Drive System (210) for the Step Motor Electronic Expansion Valve enabling the digital refrigeration controller (100) to perform the superheat degree control. A Step Motor Electronic Expansion Valve Drive System (210) useful for the purposes of the invention comprises semiconductor switches and enables the digital refrigeration controller (100) to control at the same time the refrigeration and superheat functions.

An Emergency Power Source (211) able to secure the digital refrigeration controller (100) working until the complete closure of the electronic valve (not represented). An Emergency Power Source (211) useful for the purposes of the invention comprises a voltage lifting solid-state switch mode converter and secures the digital refrigeration controller (100) working during the period at which the expansion valve (not represented) closure is mandatory due to power outage.

A Current Monitor (212) for providing feedback into the digital refrigeration controller (100) on the expansion valve (not represented) operating status. A Current Monitor (212) is useful for the purposes of the invention since it provides feedback, which enables the digital refrigeration controller (100) to be aware of the expansion valve (not represented) operating status, improving the operating safety of the refrigeration process, since operation alarms can be triggered.

The digital refrigeration controller (100) working System (200) for the control of the superheat of the refrigerant fluid will be described below.

The onboard Processing Unit (206) communicates with serial communication Interface (202), Human-Machine Interface (205), Real Time Clock (209) and Step Motor Electronic Expansion Valve Drive System (210).

The communication of onboard Processing Unit (206) with Real Time Clock (209) enables the creation of a digital defrosting planner besides the planner of the so-called economy mode, referring to events of scheduled alteration in the adjustment set-point of the refrigeration process at low demand hours, enabling power savings. The power savings obtained by the system of the invention is higher than that of state-of-the-art systems, since the energy consumption of additional modules is cancelled.

The onboard Processing Unit (206) communicates further with Serial Communication Interface (202), and with Sensor Signal Conditioning System (203). These sensors have been mentioned in the description of FIG. 3, being referred to as S1 for the power measured in the refrigeration process, S2 for the current temperature measured in the evaporator, S3 for current temperature measured at the compression suction port, and P1 for suction pressure of the refrigerant fluid in the compressor. These sensors provide feedback signals for the PID algorithm, digitally implemented in Unit (206) which by means of its connections with Serial Communication interface (202), Human-Machine Interface (205), Clock (209) and System (210) secures responsive control since its direct connection is not subject to network traffic.

According to the invention, by measuring the refrigerant fluid pressure Sensor Signal Conditioning System (203) enables the creation of a refrigerant fluid retreat function—pump-down. In state-of-the-art systems this work is usually performed by external equipment to the controller, adding volume to the setup and further equipment acquisition cost. Additionally, the adjustment of this function becomes more complex and less practical, since the extra equipment traditionally does not communicate with the process controller, requiring thus manual adjustment subject to human failure.

Still according to the invention, the pressure measurement, when converted into saturated temperature, enables the creation of protection against low evaporation temperature (LOP) and high evaporation temperature (MOP). Such protections work for extreme operation situations, typically transitory events when high-intensity thermal loads are requested. Such situations can compromise the compressor operating useful life in the refrigeration system, since it will require more electromechanical effort at the transitory condition.

The onboard Processing Unit (206) provides digital switching signals of frequency and amplitude such that when applied to Step Motor Electronic Expansion Valve Drive System (210), the same command the required modulation to maintain the superheat degree. Advantageously, in the invention, the integration between said elements (206) and (210) renders the response to the control more agile by facilitating the information exchange on measurements and control signals at high data rates, since they are in the same module, eliminating the network traffic conflict.

Still, the referred to onboard Processing Unit (206) together with Current Monitor (212) enables to obtain the valve status, with the possibility to determine if it is operational or not. Advantageously, this functionality widens the working safety of the refrigeration facility, since it creates operating alarms for the refrigeration plant technical responsible staff, reducing the possibility of equipment damage. This relevant functionality is not described nor suggested in state-of-the-art technique systems.

As can be seen in FIG. 4 flowsheet, a Power Source Detection and Selection System (207) continuously monitors the electrical voltage supplied by Main Power Source (201); in case it fails due to power shortage, Emergency Power Source (211) is actuated and receives power stored in the Emergency Power Backup System (208).

The Emergency Power Backup System (208) is managed by Control Power System (204) securing that the stored power will be sufficient for the needs of the step motor electronic expansion valve emergency closure in case of power outage, providing competitive advantage to the present invention before the state-of-the-art technique, since the need of external module for power supply in case of power shortage is eliminated.

The logical and physical connection between Main Power Source (201), Power Control (204), Processing Unit (206), Detection and Selection Source System (207), Emergency Power Backup System (208), Step Motor Electronic Expansion Valve Drive System (210), Emergency Power Source (211) and Current Monitor (212) of System (200) render the digital refrigeration controller (100) able to deal with power outage events and even so secure the emergency closure of the Step Motor Electronic Expansion Valve (not represented).

When in service, the interaction between the various elements of system (200) to control the refrigerant fluid superheat whenever a power outage is detected will be described below.

System (200), whenever a power outage by Power Source Detection and Selection System (207) is detected:

a) said Power Source Detection and Selection System (207) signalizes to Processing Unit (206) and also commutes Emergency Power Source (211);
b) the signal received by said Power Source Detection and Selection System (207) by Processing Unit (206) starts the expansion valve closure by means of Step Motor Electronic Expansion Valve Drive System (210) where Current Monitor (212) implements the Status feedback;
c) Emergency Power Source (211) commuted by Power Source Detection and Selection System (207) receives power stored in the Emergency Power Backup System (208) previously loaded by Charge Control System (204); and
d) Power Source Detection and Selection System (207) implements the Emergency Power Source (211) commutation while the interaction between Main Power Source (201), Charge Control System (204) and Emergency Power Backup System (208) secures that Emergency Source (211) works whenever required.

The previous description related to the digital refrigeration controller (100) and the relationships among the several elements comprising the onboard control system (200) is additionally detailed below:

a) A Processing Unit (206) for the management of the digital refrigeration controller (100) through the execution of pre-scheduled and stored instructions in a non-volatile electronic memory, said Unit being connected to the following elements:
  a1) a Serial Communication Interface (202) for interfacing and remote operation control;
  a2) a Sensor Signal Conditioning System (203) for conditioning the sensors signals into a standard compatible with the electrical standard of said Processing Unit (206);
  a3) a Charge Control System (204) to keep the suitable power load level in Emergency Power Backup System (208);
  a4) a Human-Machine Interface (205);
  a5) a Power Source Detection and Selection System (207) to enable the refrigeration controller (100) to continue operating even in case of power outage;
  a6) an Emergency Power Backup System (208) to keep sufficient energy for the closure of the electronic valve in case of power outage;
  a7) a Real Time Clock (209) for creating defrosting events scheduling and entry in economy mode; and
  a8) a Step Motor Electronic Expansion Valve Drive System (210); b) A Main Power Source (201), said Power Source (201) being connected to the Charge Control System (204), to Power Source Detection and Selection System (207) and to Sensor Signal Conditioning System (203);
c) An Emergency Power Source (211) to keep refrigeration controller (100) working until the complete closure of the electronic valve, connected to the Power Source Detection and Selection System (207) and to Emergency Power Backup System (208); and
d) A Current Monitor (212) for feedback into said refrigeration controller (100) of the electronic expansion valve operating Status.

Further, it is possible to configure the digital refrigeration controller (100) of the invention to operate only in the Driver function, where the functions and logics of refrigeration are disabled and it works just to drive the step motor electronic expansion valve and superheat degree with PID feed back.

Further, the digital refrigeration controller (100) is provided with protection functions integrated to preserve the compressor from low superheat events (LoSH), low evaporation temperature (LOP) and high evaporation temperature (MOP), adding parameters to set forth the conditions for alarms and reactions to same. Such protection from low superheat events (LoSH) works in transitory events of high thermal load alteration, acting to hinder the return of liquid state refrigerant fluid to the compressor.

Thus, the provided technological novelty is an advancement to the state-of-the-art technique in that it comprises a digital refrigeration controller (100) complete and integrated to be disposed in a cabinet door or electrical panel command, making it easier the installation and operation of plants and industrial and commercial refrigeration processes by integrating a huge set of systems in a single, compact controller, arranged in a single module.

Figure 1:
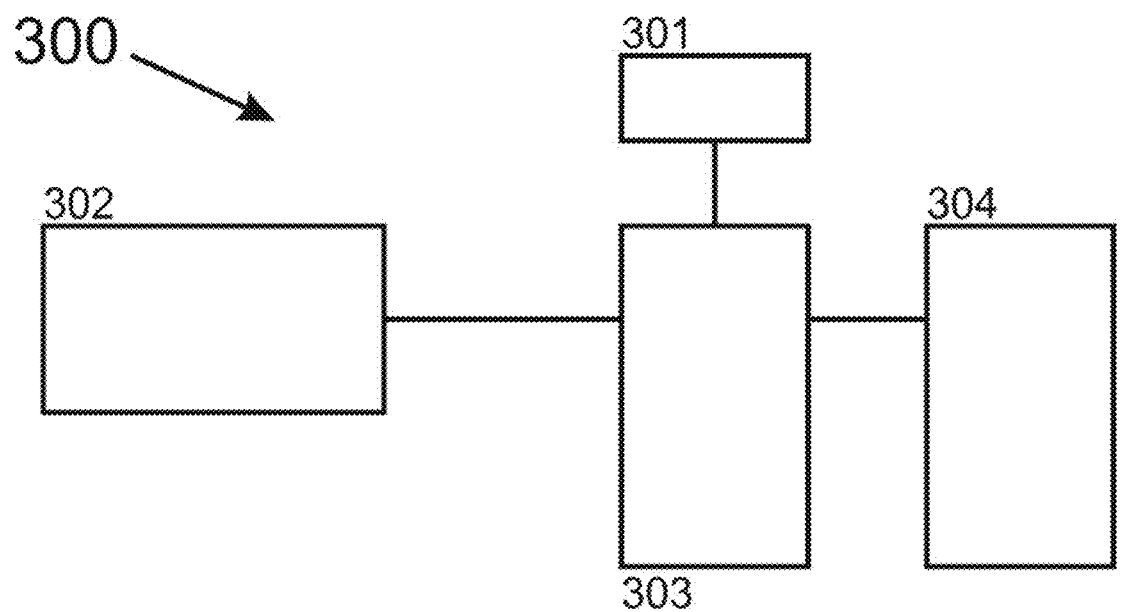
FIG. 1 is a simplified scheme of a state-of-the-art refrigeration controller system, with individual, separated modules.

Such systems are currently disposed in individual modules, such as can be schematically seen in the block diagram of FIG. 1, where the control element (302) is external, connected by wires to electronic expansion valve (301) driver (303), powered by external carrier (304) acting on electronic valve (301). These state-of-the-art systems hinder the adjustment and parametrization process of the functions, since their elements are physically separated, without logic communication among them. In this sense the invention provides new operating and competitive advantages by enabling Processing Unit (206) to control the several above-mentioned functions while the interaction among elements of System (200) integrated to digital refrigeration controller (100) results in a less complex installation.

Thus, in spite of the fact that the elements which comprise the arrangement of System (200) for control of the digital refrigeration controller (100) are commercially available, the present invention is not only new, since there is no known single-module, similar equipment to perform the desired control function, but also inventive, since it incorporates logical communication among the various elements to obtain not described nor suggested results in state-of-the-art technique, making it easier the functions adjustment and parametrization process, while at the same time the installation complexity is reduced.

Advantageously, the invention, by considering the reduction of inputs and raw materials as plastics, further extending to metals in the installation and production steps, objectively reduces such needs in accordance with the current environmental concerns. Such concern is of paramount importance nowadays, since Brazil is the 4th country in plastic waste production, see <https://www.wwforg.br/?70222/Brasil-e-o-4-pais-do-mundo-que-mais-gera-lixo-plastico>.

We claim:

1. A digital refrigeration controller with an integrated module driven Electronic Expansion Valve, said digital refrigeration controller (100) being provided with a non-volatile electronic memory and characterized in that it is provided with an onboard System (200) comprising the following elements:

a) a Processing Unit (206) for managing the digital refrigeration controller (100) through the execution of pre-scheduled and stored instructions in the non-volatile electronic memory, said Processing Unit being connected to the following elements:
  a1) a Serial Communication Interface (202) for interfacing and a remote operation control;
  a2) a Sensor Signal Conditioning System (203) for conditioning sensor signals into a standard compatible with an electrical standard of said Processing Unit (206);
  a3) a Charge Control System (204) to keep a power charge level in a Backup Power Supply Charging System (208);
  a4) a Human-Machine Interface (205);
  a5) a Power Supply Detection and Selection System (207) to enable the digital refrigeration controller (100) to continue operating even in case of a power outage;
  a6) a Backup Power Supply Charging System (208) to to store energy for the closure of the electronic valve in case of the power outage;
  a7) a Real Time Clock (209) for scheduling defrosting events and entering an economy mode; and
  a8) a Step Motor Electronic Expansion Valve Drive System (210);
b) a Power Supply (201), said Power Supply (201) being connected to the Charge Control System (204), the Power Supply Detection and Selection System (207) and the Sensor Signal Conditioning System (203);
c) a Backup Power Supply (211) to keep the digital refrigeration controller (100) working until a complete closure of the electronic valve, connected to the Power Supply Detection and Selection System (207) and to the Backup Power Supply Charging System (208); and
d) a Current Monitor (212) for feedback into said digital refrigeration controller (100) of an operating Status of said electronic expansion valve.

2. The digital refrigeration controller according to claim 1, characterized in that the Sensor Signal Conditioning System (203) creates a refrigerant fluid retreat function (Pump-down).

3. The digital refrigeration controller according to claim 1, characterized in that the Power Supply Detection and Selection System (207) is further connected to the Power Supply (201), the Step Motor Electronic Expansion Valve Drive System (210), the Backup Power Supply (211) and the Current Monitor (212).

4. The digital refrigeration controller according to claim 1, characterized in that, when in service, upon the power outage being detected by Power Supply Detection and Selection System (207):

a) said Power Supply Detection and Selection System (207) sends a signal to the Processing Unit (206) and also to the Backup Power Supply (211);
b) the signal received by the Processing Unit (206) starts closing the expansion valve by means of the Step Motor Electronic Expansion Valve Drive System (210) where the Current Monitor (212) implements the operating Status feedback;
c) the Backup Power Supply (211) signaled by the Power Supply Detection and Selection System (207) receives power stored in the Backup Power Supply Charging System (208) previously charged by the Charge Control System (204); and
d) the Power Supply Detection and Selection System (207) sends the signal to the Backup Power Supply (211) while the interaction between the Power Supply (201), the Charge Control System (204) and the Backup Power Supply Charging System (208) secures that the Backup Power Supply (211) works whenever required.

5. The digital refrigeration controller according to claim 1, characterized in that an outer rear portion of said integrated module driven electronic expansion valve comprises sensor S1 connected between a first connector (111) and a second connector (112), sensor S2 connected between a third connector (113) and a fourth connector (114), sensor S3 connected between between a fifth connector (115) and a sixth connector (116), and sensor P1 connected between a seventh connector (123) and an eighth connector (124).

6. The digital refrigeration controller according to claim 5, characterized in that the outer rear portion of said integrated module driven electronic expansion valve comprises further the power supply (201) of the digital refrigeration controller (100) between a ninth connector (121) and a tenth connector (122), a digital input between an eleventh connector (117) and a twelfth connector (118), and a serial communication port between a thirteenth connector (119) and a fourteenth connector (120).

7. The digital refrigeration controller according to claim 5, characterized in that the outer rear portion of said integrated module driven electronic expansion valve comprises further the Step Motor Electronic Expansion Valve Drive System being connected between a ninth connector (126) through a thirteenth connector (130).

8. The digital refrigeration controller according to claim 5, characterized in that the outer rear portion of said integrated module driven electronic expansion valve comprises further a compressor (132) output, a ventilator (133) output, a defrost output (134) a lamp (135) or auxiliary (135) output and a common terminal.

* * * * *